US010241895B2

(12) United States Patent
Stone et al.

(10) Patent No.: US 10,241,895 B2
(45) Date of Patent: Mar. 26, 2019

(54) MEMORY STACK TRACE MANAGEMENT TOOL

(71) Applicant: Apple Inc., Cupertino, CA (US)

(72) Inventors: Katherine Blake Stone, Santa Cruz, CA (US); David Vernon Payne, Los Altos Hills, CA (US); Daniel Mark Delwood, San Jose, CA (US)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 15/355,725

(22) Filed: Nov. 18, 2016

(65) Prior Publication Data

US 2017/0083426 A1 Mar. 23, 2017

Related U.S. Application Data

(62) Division of application No. 14/038,648, filed on Sep. 26, 2013, now Pat. No. 9,529,692.
(Continued)

(51) Int. Cl.
*G06F 13/12* (2006.01)
*G06F 11/36* (2006.01)
(Continued)

(52) U.S. Cl.
CPC ........ *G06F 11/364* (2013.01); *G06F 11/3024* (2013.01); *G06F 11/3037* (2013.01);
(Continued)

(58) Field of Classification Search
CPC ............. G06F 11/3476; G06F 11/3037; G06F 2201/86; G06F 2201/88; G06F 2201/815;
(Continued)

(56) References Cited

U.S. PATENT DOCUMENTS 5,408,650 A * 4/1995 Arsenault ............. G06F 11/323
345/502
5,604,851 A 2/1997 Taylor .......................... 345/44 D
(Continued)

OTHER PUBLICATIONS

Oracle8i Design and Tuning Performance Release 2(8.1.6), by Oracle, Dec. 1999.*
(Continued)

*Primary Examiner* — Jing-Yih Shyu
(74) *Attorney, Agent, or Firm* — Womble Bond Dickinson (US) LLP

(57) ABSTRACT

The present technology monitors events that allocate and deallocate virtual memory regions in a device, wherein the events include system calls from user space. The system can generate a log of events, and based on the log of events, track regions of virtual memory allocated and deallocated via the events. The system can also record events with corresponding stack traces. Next, the system can group recorded events having matching stack traces to yield event groupings, and instrument functions in a compiled code associated with the process to determine retain counts of respective events associated with the functions. The system can then automatically pair at least one of a first portion of the events and a second portion of the respective events based on the event groupings and the retain counts of the respective events to yield paired events.

18 Claims, 10 Drawing Sheets

Related U.S. Application Data

(60) Provisional application No. 61/832,720, filed on Jun. 7, 2013.

(51) Int. Cl.
*G06F 11/30* (2006.01)
*G06F 11/34* (2006.01)

(52) U.S. Cl.
CPC ...... *G06F 11/3476* (2013.01); *G06F 11/3495* (2013.01); *G06F 11/3668* (2013.01); *G06F 2201/815* (2013.01); *G06F 2201/86* (2013.01); *G06F 2201/88* (2013.01)

(58) Field of Classification Search
CPC ............... G06F 11/364; G06F 11/3668; G06F 11/3495; G06F 11/3024
See application file for complete search history.

(56) References Cited

U.S. PATENT DOCUMENTS

| | | | | |
|---|---|---|---|---|
| 6,522,939 B1 | | 2/2003 | Strauch et al. | 700/118 |
| 6,817,011 B1* | | 11/2004 | Reynolds | G06F 11/3409 |
| | | | | 714/E11.192 |
| 7,058,796 B2 | | 6/2006 | Olivert | 711/203 |
| 7,356,655 B2 | | 4/2008 | Allen et al. | 711/153 |
| 7,774,741 B2* | | 8/2010 | Sridharan | G06F 11/0748 |
| | | | | 711/170 |
| 7,975,260 B1* | | 7/2011 | Conover | G06F 9/44563 |
| | | | | 711/153 |
| 8,145,871 B2 | | 3/2012 | Pafumi et al. | 711/170 |
| 9,135,082 B1* | | 9/2015 | Sheng | G06F 9/524 |
| 2006/0253507 A1* | | 11/2006 | Schank | H04L 67/125 |
| 2006/0263507 A1 | | 11/2006 | Miljkovic | H04L 67/125 |
| 2008/0270994 A1* | | 10/2008 | Li | G06F 11/366 |
| | | | | 717/128 |
| 2009/0006909 A1 | | 1/2009 | Ladd et al. | 714/87 |
| 2010/0631270 | | 2/2010 | Wu et al. | |
| 2011/0119456 A1 | | 5/2011 | Ipek et al. | |
| 2011/0283266 A1* | | 11/2011 | Gallagher | G06F 9/44 |
| | | | | 717/130 |
| 2012/0092699 A1* | | 4/2012 | Moore | H04L 63/1416 |
| | | | | 358/1.15 |
| 2012/0144374 A1* | | 6/2012 | Gallagher | G06F 11/3466 |
| | | | | 717/128 |
| 2012/0203997 A1 | | 8/2012 | Block | 711/170 |
| 2012/0331135 A1* | | 12/2012 | Alon | H04L 41/044 |
| | | | | 709/224 |
| 2013/0117256 A1* | | 5/2013 | Gu | G06F 17/30424 |
| | | | | 707/718 |
| 2014/0282031 A1* | | 9/2014 | Hinterbichler | G06F 11/3656 |
| | | | | 715/738 |

OTHER PUBLICATIONS

"Memory Usgae Performance Guidelines", Apple Inc., © all rights reserved., Apr. 23, 2013, 47 pages.

\* cited by examiner

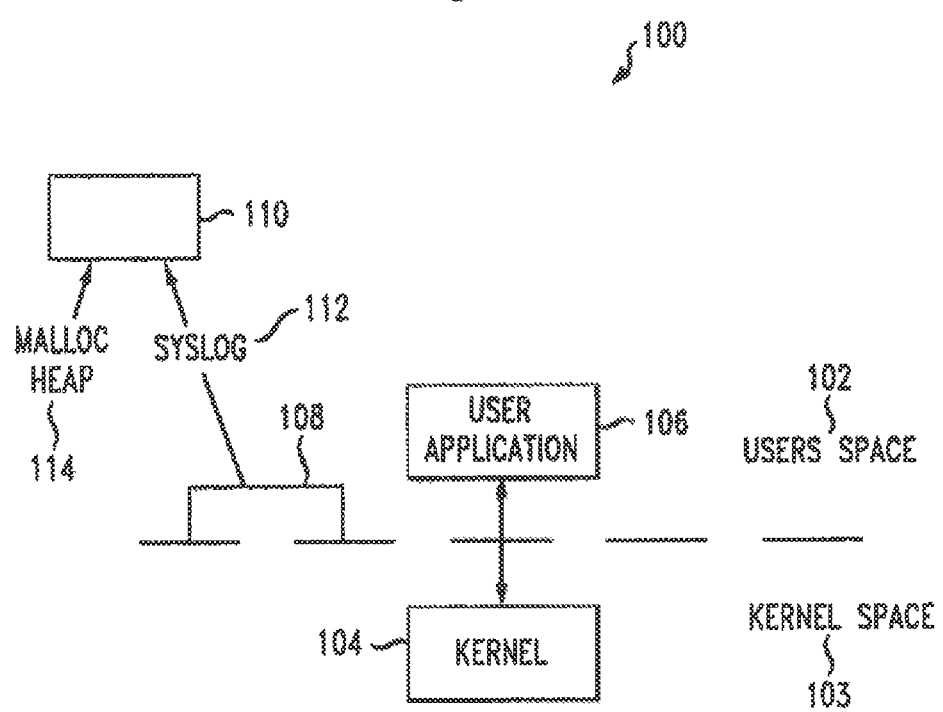

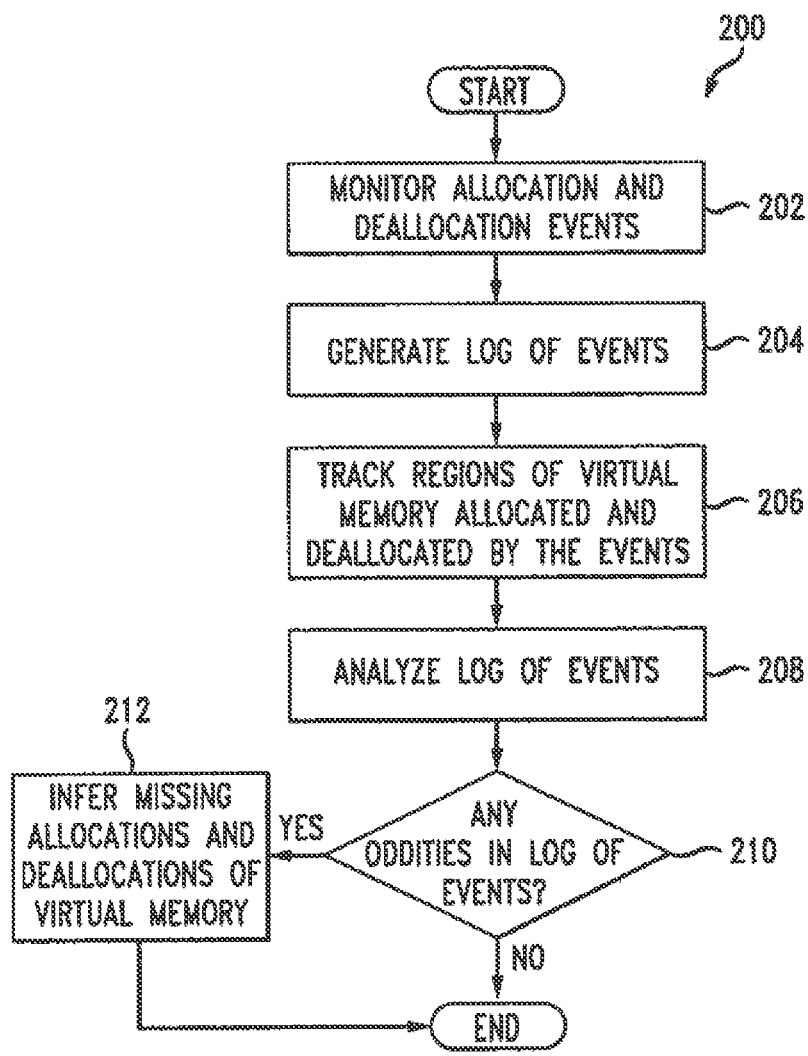

FIG. 3

300 — Allocations

Statistics / Object Summary — 302

| GRAPH | CATEGORY | LIVE BYTES ▼ | #LIVING | #TRANSIENT | OVERALL BYTES | #OVERALL | BYTES ALLOCATED (NET/OVERALL) |
|---|---|---|---|---|---|---|---|
| ☑ | All Allocations* | 85.02 MB | 17,646 | 67,368 | 134.96 MB | 85,014 | ‡‡‡ |
| ☐ | All VM Regions* | 2.34 MB | 17,570 | 67,115 | 26.59 MB | 84,685 | ‡‡‡ |
| ☐ | VM: Mapped File | 82.68 MB | 76 | 253 | 108.36 MB | 329 | |
| ☐ | VM: Allocation 15.98 MB | 47.13 MB | 28 | 6 | 47.31 MB | 34 | |
| ☐ | VM: Dispatch Continu.. | 15.98 MB | 1 | 0 | 15.98 MB | 1 | |
| ☐ | VM: CoreService | 8.00 MB | 1 | 0 | 8.00 MB | 1 | |
| ☐ | VM: CG raster data | 2.09 MB | 1 | 0 | 2.09 MB | 1 | |
| ☐ | VM: dyld | 240.00 KB | 4 | 4 | 1.13 MB | 8 | |
| ☐ | Malloc 4.00 KB | 192.00 KB | 2 | 0 | 192.00 KB | 2 | |
| ☐ | Malloc 8.00 KB | 160.00 KB | 40 | 247 | 1.12 MB | 287 | |
| ☐ | Malloc 64.50 KB | 144.00 KB | 18 | 4 | 176.00 KB | 22 | |
| ☐ | CGSImageData | 129.00 KB | 2 | 2 | 258.00 KB | 4 | |
| ☐ | CFString (immutable) | 120.88 KB | 37 | 111 | 374.61 KB | 148 | |
| ☐ | CFBasicHash (value-st... | 107.77 KB | 2,587 | 6,340 | 445.66 KB | 8,927 | |
| ☐ | _NSViewAuxiliary | 105.05 KB | 520 | 3,438 | 1.31 MB | 3,958 | |
| ☐ | CFBasicHash (key-store) | 102.09 KB | 242 | 12 | 107.16 KB | 254 | |
| ☐ | Malloc 2.00 KB | 97.50 KB | 455 | 3,246 | 998.06 KB | 3,701 | |
| ☐ | Malloc 32 Bytes | 84.00 KB | 42 | 257 | 588.00 KB | 299 | |
| ☐ | Malloc 64 Bytes | 58.62 KB | 1,878 | 4,908 | 212.00 KB | 6,784 | |
| ☐ | Malloc 128 Bytes | 51.38 KB | 822 | 3,316 | 258.62 KB | 4,138 | |
| ☐ | VM: Memory Tag 255 | 44.50 KB | 356 | 1,727 | 260.38 KB | 2,083 | |
| ☐ | Malloc 256 Bytes | 44.00 KB | 11 | 0 | 44.00 KB | 11 | |
| ☐ | | 41.50 KB | 166 | 493 | 164.75 KB | 659 | |

304

▽ GENERATION ANALYSIS
( MARK GENERATION )

▽ ALLOCATION LIFESPAN
○ ALL OBJECTS CREATED
● CREATED & STILL LIVING
○ CREATED & DESTROYED

▽ ALLOCATION TYPE
○ ALL ALLOCATIONS
● ALL HEAP ALLOCATIONS
○ ALL VM REGIONS

▽ CALL TREE
☐ SEPARATE BY CATEGORY
☐ SEPARATE BY THREAD
☐ INVERT CALL TREE
☐ HIDE MISSING. SYMBOLS..
☐ HIDE SYSTEM LIBRARIES
☐ SHOW OBJ.C ONLY
☐ FATTEN RECURSION

△ CALL TREE CONSTRAINTS
△ SPECIFIC DATA MINING

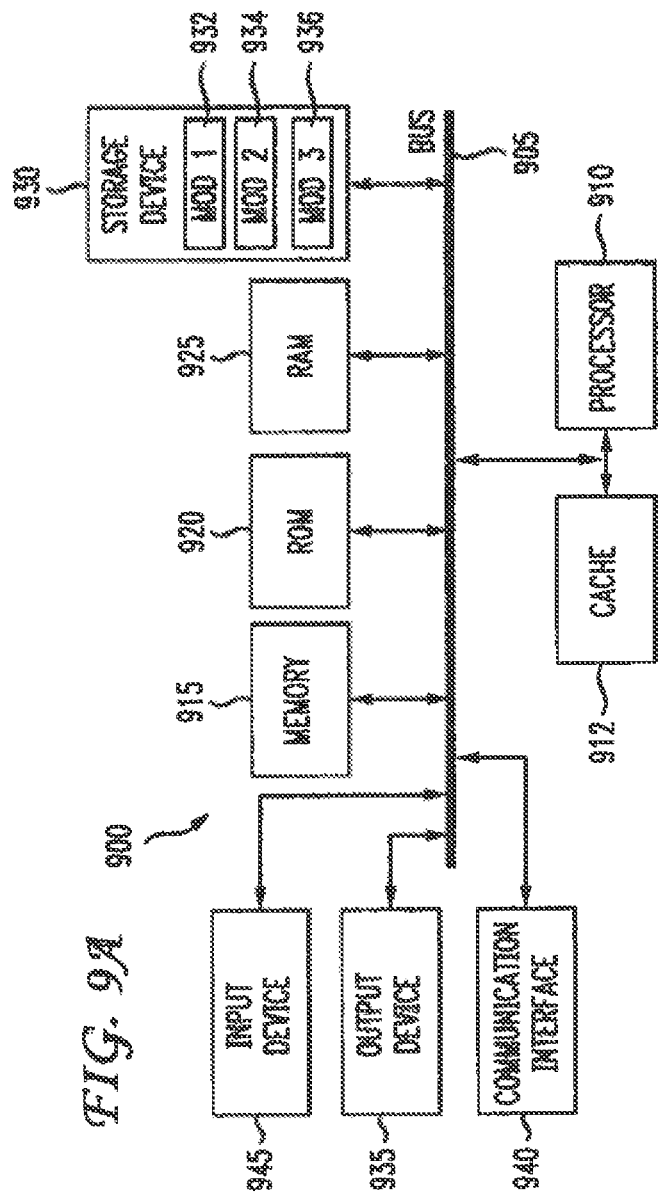

MEMORY STACK TRACE MANAGEMENT TOOL

CROSS-REFERENCE TO RELATED APPLICATIONS

This application is a divisional of co-pending U.S. application Ser. No. 14/038,648 filed on Sep. 26, 2013, which claims benefit to U.S. Provisional Application No. 61/832,720, entitled "MEMORY MANAGEMENT TOOLS", filed Jun. 7, 2013, which is expressly incorporated by reference herein its entirety.

TECHNICAL FIELD

The present technology pertains to memory management, and more specifically pertains to tools for managing virtual memory allocations and allocation events.

BACKGROUND

Software applications provide the necessary logic that allows us to use computers in meaningful ways. Not surprisingly, innovation in computers is largely dependent on the software that supports it. Accordingly, software engineers spend a great deal of time and effort testing and developing the software that supports our uses and demands for computers.

A key aspect of developing and troubleshooting software is understanding the software's use of memory resources at the device. As software applications grow in complexity, they often use and require a greater amount of memory resources. Moreover, when the number of software applications running at a device increases, the amount of memory available for each software application generally decreases, precisely because the different software applications have to share a limited amount of memory at the device. Improperly managed memory resources can cause significant problems for the software application and the user. For example, data freed or overwritten while still in use can cause memory corruption, which typically causes the software application to crash, or worse, results in corrupted user data. Further, memory leaks can result when data is not properly freed after use. A memory leak can cause the software application to use ever-increasing amounts of memory, which can then exhaust the memory available and lead to poor system performance or a system crash. It is thus extremely important to track and intelligently manage the use of memory resources at the device.

Unfortunately, given the growing complexity of software applications and large number of processes typically running on a device, it is increasingly more difficult to accurately and efficiently track the use of memory resources at a device. Current solutions allow users to manage and monitor heap memory allocations at a device. However, these solutions are not capable of tracking virtual memory allocations and deallocations at the device. Accordingly, users are unable to effectively manage virtual memory at the device. Yet virtual memory is a very important memory resource used by most software applications to properly function, and its proper use and management can have a significant impact on the software application's performance and stability. In addition, current solutions do not provide an effective and efficient way to track, manage, and monitor memory allocation and deallocation events, or determine which events should be analyzed and treated as a pair. And the alternative of manually analyzing and pairing individual events can be a daunting task.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to accurately and efficiently track the use of memory resources at a device. In particular, these approaches can be used to track and manage the allocation of virtual memory at the device, as well as heap memory. This can allow users to obtain a more complete picture of the use and allocation of memory at the device, and can provide the user an advantage when managing and troubleshooting memory use at the device. These approaches can also be used to automatically pair allocation and deallocation events, and suggest probable matches and/or pairs. This can help the user to more efficiently and accurately identify and troubleshoot memory leaks, as well as other memory issues. Moreover, these approaches can be used to count object references and better manage allocation and deallocation events.

Moreover, event-based monitoring of a process' virtual memory management routines and reference counting primitives can enable the development of more effective and automated memory modeling and debugging tools. Specifically, user-space monitoring of functions resulting in changes to the process' virtual memory regions can provide additional value when combined with more traditional heap-focused methods, and this monitoring can be accomplished via system-level instrumentation of VM allocation/deallocation routines, interpolation of missing events due to interactions from other processes, and using these events to continuously model the process' VM layout. Instrumentation of a process' reference counting primitives can allow for automatic analysis and pairing of reference counting events to reduce the debugging complexity of these logs. The automatic analysis can be accomplished by matching memory storage locations when available, grouping remaining events by identical stack trace, and applying stack-trace/event-type heuristics to these groupings. Disclosed are systems, methods, and non-transitory computer-readable storage media for managing memory allocations. In some embodiments, the system first monitors events that allocate and deallocate virtual memory regions in a device, wherein the events include system calls from user space associated with a process running on the device. The system can also monitor malloc heap memory allocation and deallocation events. Further, the system can also record the monitored events and store a record of the events.

The system can monitor the events by analyzing, reading, intercepting, and/or recording the system calls between kernel space and user space. The system calls can be messages for allocating and deallocating virtual memory at the device. For example, the system calls can include mmap functions, munmap functions, mach_vm_allocate functions, mach_vm_deallocate functions, mach_vm_map functions, mach_vm_remap functions, mach_vm_read functions, etc.

The system can include a software program and/or a portion of code for monitoring the events by analyzing, reading, intercepting, and/or recording the system calls, as previously described. The software program and/or the portion of code can reside between the kernel space and the user space, for example. In some embodiments, the software program and/or the portion of code resides in user space, where it monitors allocation and deallocation messages between the user space and the kernel space.

Next, the system generates a log of the events. The log can include the virtual memory allocation and deallocation events, and/or any information associated with the virtual memory allocation and deallocation events. In some cases, the log can also include malloc heap memory allocation and deallocation events. The system can store the log of the events locally and/or transmit it to a remote device, such as a server. Based on the log of the events, the system can then track regions of virtual memory allocated and deallocated via the events. For example, the system can analyze the log of the events to track the regions of virtual memory allocated and deallocated via the events. The system can also infer allocations and/or deallocations of virtual memory based on oddities detected in the log of the events. For example, the system can infer a missing virtual memory allocation by identifying a virtual memory deallocation event having no corresponding virtual memory allocation event. Similarly, the system can infer a missing virtual memory deallocation by identifying a virtual memory allocation event associated with a region of memory, followed by another virtual memory allocation event associated with the same region of memory. The system can track the missing virtual memory allocation and deallocation events, in addition to the recorded virtual memory allocation and deallocation events. Further, the system can add any missing virtual memory allocation and deallocation events identified/inferred by the system to the log of the events, in order to supplement the log of the events with the missing events, and keep track of the missing events.

The system can display information associated with the events that allocate and deallocate virtual memory regions. In some cases, the system can also display information associated with malloc heap memory allocation and deallocation events. The system can display the information via a graphical user interface, for example. Moreover, the system can display the information in response to a request for the information, such as a user request, for example. The system can sort and/or filter the information displayed based on one or more factors, such as a type or category of events, a time of events, a caller associated with the events, a library associated with the events, and/or any other characteristic of the events. The information can include virtual memory allocation and deallocation statistics, as well as heap memory allocation and deallocation statistics. The information can also include one or more events from the log of the events, and/or any corresponding details.

The system can combine the log of the events with one or more previous logs of allocation and deallocation events to generate a historical log of allocation and deallocation events. The system can also display information associated with the historical log of allocation and deallocation events. This way, the system can provide a historical view of memory consumption and/or allocation. This can be used, for example, for troubleshooting, diagnosing issues, projecting statistics, etc. When displaying information associated with the historical log of allocation and deallocation events, the system can filter the information displayed by a specific time of events and/or a specific range of times of events. The system can also sort and/or filter the information by a category or type of events, a library, a caller, etc.

In some embodiments, the system records events with corresponding stack traces, wherein the events are associated with a process running on a device. The system then groups at least one autorelease event with at least one corresponding release event to yield at least one event grouping. The system can also instrument functions in a compiled code associated with the process and determine retain counts of objects being operated upon by the functions. In some cases, one or more of the functions can operate on memory storage locations that, when available, can be recorded into the events. Next, the system automatically pairs retain and release events having a matching and available memory storage location. Two events can be deemed to be an exact match if a retain event and a subsequent release event share a memory storage location, with no events having that memory storage location in between. The two matching events can be paired with a high level of confidence.

The system can also group events having identical stack traces. The system can sort the groups by the number of events in the respective groups. Moreover, the system can pair retain and release groups that add up to zero and have partially matching stack traces. The system can pair the retain and release groups in response to a request from a user or automatically based on a determination that the retain and release groups add up to zero and have partially matching stack traces. For example, groups of events can be paired when a collection of groups is identified where, together, they contain an identical number of retain and release events and the groups have at least partially matching stack traces.

The pairing of the retain and release groups here can be associated with a lower confidence level than the exact matches discussed above. The confidence level of a pairing, however, can increase as the number of matching items in their stack traces and the number of events in the retain and release groups increase.

In some cases, events that are not paired can be identified as possible matches. For example, if a pairing of events or groups of events has a low confidence level, the system can mark them as possible matches without automatically pairing them. To illustrate, groups of events having a low similarity of stack traces (or stack trace similarity below a minimum threshold) can be identified as possible matches. The system can display the possible matches and suggest them to a user. The user can then select to pair or reject one or more of the possible matches. Thus, the user can manually pair any of the possible matches if he or she thinks the possible matches are actual matches.

When automatically pairing events, the system can assign a confidence level to each pairing of events. The confidence level can be based on the likelihood of a correct match. For example, exact matches, as previously described, can be assigned a highest confidence level, as they are known to be a match. The confidence level assigned to pairing groups can also be increased or decreased based on the size of their matching stack traces. For example, groups of events having deeper or longer stack traces (i.e., stack traces with more layers), can be assigned a higher confidence level than groups of events with smaller or shorter stack traces (i.e., stack traces with less layers). Further, possible matches, as previously described, can be assigned a lowest confidence level, as it is uncertain whether they are indeed a match. In addition, the system can automatically pair events based on a predetermined threshold value. The predetermined threshold value can also be modified/configured according to a desired sensitivity.

The recorded events can be displayed by the system via a graphical user interface. The graphical user interface can also display the paired events. In some cases, the paired events can be highlighted or adapted in any way to graphically distinguish the paired events from recorded events that have not been paired. Moreover, as previously mentioned, the system can display possible matches via the graphical user interface. In some cases, the possible matches can be separated from the recorded events and/or the paired events. The possible matches can also be highlighted, identified as possible matches, and/or adapted in any way to graphically distinguish the possible matches from the recorded events and/or the paired events. The system can also receive input from a user via the graphical user interface, to allow the user to manage the events on display. For example, the system can browse or navigate inputs from the user, to allow the user to browse through the events and/or any information displayed about the events. The user can make a selection to enter into an expanded view of one or more events, and/or to instruct the system to display other information about the events. The graphical user interface can include a button to allow a user to manually pair or unpair events. Here, the user can select one or more events and press the button to manually pair or unpair the selected events. The graphical user interface can also provide sort and/or filter options to allow the user to manage the content and/or display of events and/or information about the events. For example, the user can sort the events by event type, filter the events by pairing status, filter events by stack traces, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates an example architecture for tracking virtual memory allocations;

FIG. 2 illustrates an example flowchart for tracking allocations and deallocations of virtual memory;

FIG. 3 illustrates an interface for managing memory allocations;

FIG. 5 illustrates an example expanded view of a category of virtual memory allocations;

FIG. 7 illustrates an example interface for managing pairings of events;

FIG. 8 illustrates an example interface for managing suggested pairings of events; and FIGS. 9A and 9B illustrate exemplary system embodiments.

DESCRIPTION

Figure 4:
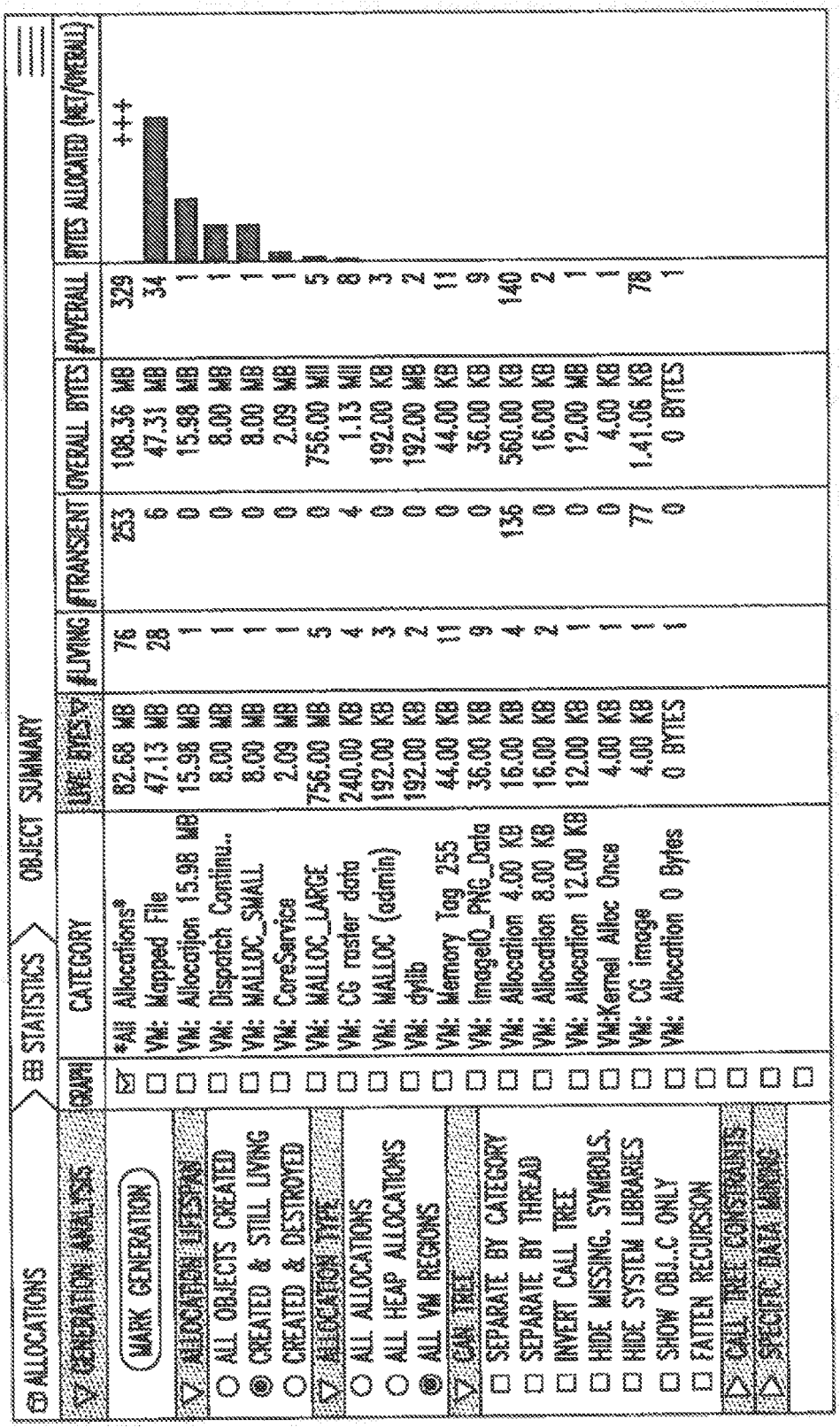
FIG. 4 illustrates an example interface view of virtual memory allocations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and effective managing of memory allocations. A system, method and computer-readable media are disclosed for managing memory allocations, including tracking virtual memory allocations, automatically pairing events, and providing graphical tools for tracking and/or managing virtual memory allocations and pairings of events. First, a description of an example architecture and an example flowchart for tracking virtual memory allocations is disclosed herein, followed by a description of graphical tools for tracking and modifying virtual memory allocations. A detailed description of technologies for automatically pairing events, and graphical tools for tracking and/or managing pairings of events, will then follow. These variations shall be described herein as the various embodiments are set forth. The disclosure now turns to FIG. 1.

FIG. 1 illustrates an example architecture 100 for tracking virtual memory allocations. The architecture 100 includes a computer system environment having user space 102, being a domain of user level applications, and a kernel space 103 being a domain of core operating system functions. Kernel space 103 includes processes that are generally responsible for the allocation and deallocation of virtual memory, which is done in response to instructions by callers from user space (such as those associated with application 106), and callers from within the operating system (such as operating system process whether in user space or kernel space). In the embodiment illustrated in FIG. 1, user application 106 can allocate and deallocate virtual memory via system calls, such as mmap( ), munmap( ), mach_vm_allocate( ), mach_vm_deallocate( ), mach_vm_map( ), mach_vm_remap( ), mach_vm_read( ), and older equivalents (e.g., vm_map( ), vm_remap( ), vm_read( ), and the like), from user space 102 into kernel space 103. To record stack log events for allocation and deallocation of virtual memory regions, stack logging calls can be added to the system calls that allocate and deallocate virtual memory regions from user space 102 of user application 106. The code 108 can be placed between the kernel space 103 and the user space 102 to read messages, such as the system calls, for allocating and deallocating virtual memory. The code 108 can reside in the user space 102, and can read the system calls between the kernel space 103 and the user space 102 in order to identify and/or monitor virtual memory allocation and deallocation events. However, in some embodiments, the code 108 can alternatively reside in the kernel space 103.

When the user application 106 does something (at any layer of library or framework within the user application 106) to explicitly allocate or deallocate virtual memory through any allocate or deallocate function, the code 108 can generate a stack logging event, such as kOAVMAllocEvent and kOAVMDeallocEvent. The code 108 can also keep track of what virtual memory regions have been allocated and deallocated via the allocation and deallocation events.

The code 108 can maintain a syslog 112 containing information about the allocation and deallocation events. The information from the syslog 112 can be saved to a logging file 110 for keeping track of the allocation and deallocation events, the regions of virtual memory allocated and/or deallocated by such events, statistics associated with the allocation and/or deallocation of virtual memory, etc. The logging file 110 can also store logging information and/or events from the malloc heap 114. Malloc stack logging calls in the malloc subsystem can be used to record stack log events for allocation and deallocation of malloc heap memory—for example, in the implementations of malloc, calloc, valloc, free, and other malloc-related functions. The stack log events for allocation and deallocation of malloc heap memory, and/or any information associated with the events, can be stored in the logging file 110 and combined with the information relating to the virtual memory allocation and deallocation events. The combined information can be in memory to provide a complete picture of memory allocation and deallocation, including both allocation and deallocation of virtual memory and malloc heap memory.

In some cases, the code 108 may not capture certain allocation and deallocation events from the kernel space 103. This can include, for example, cases where the kernel 104 allocates and/or deallocates virtual memory regions for the user application 106 from within the kernel space 103. For example, IOKit can allocate virtual memory regions on behalf of the user application 106, to give it access to various, additional hardware and device-driver related items. Moreover, the kernel 104 can allocate and deallocate virtual memory regions for thread stacks, as the threads are created and destroyed. Further, when the user application 106 receives Mach messages sent to it by another process, the kernel 104 may, in some cases, allocate virtual memory to pass the "payload" data for the Mach message into the user application 106. Similarly, when the user application 106 sends a Mach message to another process, the kernel 104 may deallocate virtual memory from the user application 106, as the Mach message goes out to the other process. In other cases, the code 108 may not capture certain allocation and deallocation events between application processes. For example, some processes may "inject" regions of shared virtual memory into application processes.

Given the various circumstances where allocation and deallocation events are not captured by the code 108, the allocation and deallocation events that are captured by the code may, at times, have oddities. For example, the code 108 may detect a virtual memory deallocation event that has no corresponding allocation event. Here, the kernel 104 may have allocated the virtual memory region that is now being deallocated, as indicated in the logged events. Moreover, the code 108 may detect a virtual memory allocation event followed by another virtual memory allocation event that overlaps all or part of the first virtual memory region, with no corresponding deallocation event. Here, the kernel 104 may have deallocated the first virtual memory region at some point before the second virtual memory allocation event, without being captured by the code 108. Even in the user space 102, there may be cases where the code 108 detects a "partial" deallocation of a region. For example, occasionally, a process allocates a bigger virtual memory region than it actually needs. As a result, the process may then deallocate a portion of the beginning and/or end of that region, resulting in the remaining virtual memory region having a specific, desired start alignment size. In these cases, the code 108 can record these "partial" deallocations as a different event type, such as kOAVMPartialDeallocEvent.

Despite the various oddities that may be detected, the virtual memory allocation and deallocation events captured by the code 108 can be used to obtain a complete picture of the virtual memory allocations and deallocations. For example, the allocation and deallocation events logged by the code 108 can be analyzed to detect any oddities, such as those described above. Once an oddity has been detected, the missing allocation and/or deallocation event can be inferred based on the allocation and deallocation events recorded by the code 108. For example, if the code 108 detects two consecutive allocation events for the same region of virtual memory, a missing deallocation event between the two consecutive allocation events can be inferred and recorded in the log file 110. In some embodiments, a mechanism—XRObjectAllocVMRegionTracker class—can be implemented to keep track of what virtual memory regions the code 108 has detected allocation and deallocation events for in user space 102. Accordingly, if an oddity is detected, such as a virtual memory deallocation with no corresponding virtual memory allocation, the code 108 can "synthesize" and record the missing allocation event. Then, the code 108 can record the incoming virtual memory deallocation event. Thus, the overall accounting of total allocated virtual memory space remains correct, despite the oddities previously detected.

FIG. 2 illustrates an example flowchart 200 for tracking allocations and deallocations of virtual memory. For the sake of clarity, the steps are described in terms of a system configured to practice the steps. The steps outlined herein are exemplary and can be implemented in any combination thereof, including combinations that exclude, add, or modify certain steps.

The system monitors allocation and deallocation events (202). The allocation and deallocation events can be events allocating or deallocating virtual memory regions. Here, the system can analyze messages between kernel space and user space for allocating and deallocating virtual memory. The system can include a software tool placed between the kernel space and the user space for analyzing, reading, recording, and/or intercepting messages to and from the kernel space. Messages for allocating and deallocating virtual memory can include system calls, such as mmap( ), munmap( ), mach_vm_allocate( ), mach_vm_deallocate( ), mach_vm_map( ), mach_vm_remap( ), mach_vm_read( ), and older equivalents (e.g., vm_map( ), vm_remap( ), vm_read( ), and the like).

The system then generates a log of the events (204). The system can analyze the allocation and deallocation events and record the events in the log of events. The log of the events can include details about the actual allocation and deallocation events monitored by the system, and any other relevant details, such as timestamps, caller, memory address, responsible library, etc. The log of the events can also include other events, such as heap malloc allocation and deallocation events, for example. For example, the system can monitor allocations and deallocations of heap memory, and add the heap memory allocation and deallocation events to the log of the events to be combined with the virtual memory allocation and deallocation events.

Next, the system can track regions of virtual memory allocated and deallocated by the events (206). In some embodiments, the system can track the regions of virtual memory allocated and deallocated by the events based on the log of the events. Here, the system can analyze the log of the events to determine the various regions of virtual memory that have been allocated and deallocated by the events.

The system can also analyze the log of events (208), to identify any oddities in the log of events. By identifying any oddities in the log of events, the system can determine any missing allocation and deallocation events, including events that were not detected or recorded during the monitoring process. For example, the system can analyze the log of events to identify any deallocation events having no corresponding allocation events. Similarly, the system can analyze the log of events to identify any allocation events having no corresponding deallocation events, which can be identified, for example, based on two allocation events of the same region of virtual memory with no deallocation events for that region of virtual memory. If any oddities are detected (210), the system can thus infer any missing allocation and/or deallocation events from the detected oddities (212). After inferring any missing allocation and/or deallocation events, the system can supplement the log of events with the missing allocation and/or deallocation events inferred. The log of events can then provide a more complete outline of the allocations and deallocations of virtual memory at the system, and can be used to better track the allocations and deallocations of virtual memory.

FIG. 3 illustrates an example interface 300 for managing memory allocations. The interface 300 can display information and statistics about virtual memory allocations at a device. The interface 300 can also display information and statistics about heap memory allocations at the device. The interface 300 can analyze virtual memory allocation and deallocation events and display information and/or statistics about the virtual memory allocation and deallocation events. Similarly, the interface 300 can analyze heap memory allocation and deallocation events and display information and/or statistics about the heap memory allocation and deallocation events The interface 300 can analyze the events during and/or after runtime. The interface 300 can also track regions of virtual memory and/or heap memory allocated and deallocated at the device, and present information, statistics, representations, etc., regarding the regions of memory allocated and deallocated at the device.

The interface 300 can include an events view 302, which displays information, such as statistics, associated with the allocations and deallocations of memory. The events view 302 can display information about virtual memory and/or heap memory allocations. For example, the events view 302 display statistics regarding virtual and/or heap memory allocations at the device. The statistics displayed at the events view 302 can include, for example, a category of allocations, a number of living allocations, a number of transient allocations, a total number of allocations, live bytes allocated, overall bytes allocated, net versus overall bytes allocated, etc. In some cases, the displayed statistics can be specific to one or more corresponding categories of allocations. Moreover, the events view 302 can sort the statistics based on any category of statistics. For example, the events view 302 can sort the statistics based on categories of allocations, number of allocations, size of allocations, etc. The events view 302 can also present other statistics, such as destroyed allocations, timestamps, stack information, etc.

The interface 300 can also include a filter 304 for selecting what information should be displayed in the events view 302. The filter 304 can be used to manage the statistics presented in the events view 302. For example, the filter 304 can be used to select allocation statistics for all objects created, objects created and living, objects created and destroyed, etc. Thus, if the option to view objects created and living is selected in the filter 304, the events view 302 would be updated to display statistics relating to objects created and living. The filter 304 can include options to filter the information displayed in the events view 302 by category of allocations. For example, the filter 304 can include options to define the scope of information in the events view 302. The scope can include, for example, all allocations, all heap memory allocations, all virtual memory allocations, etc.

Figure 5:
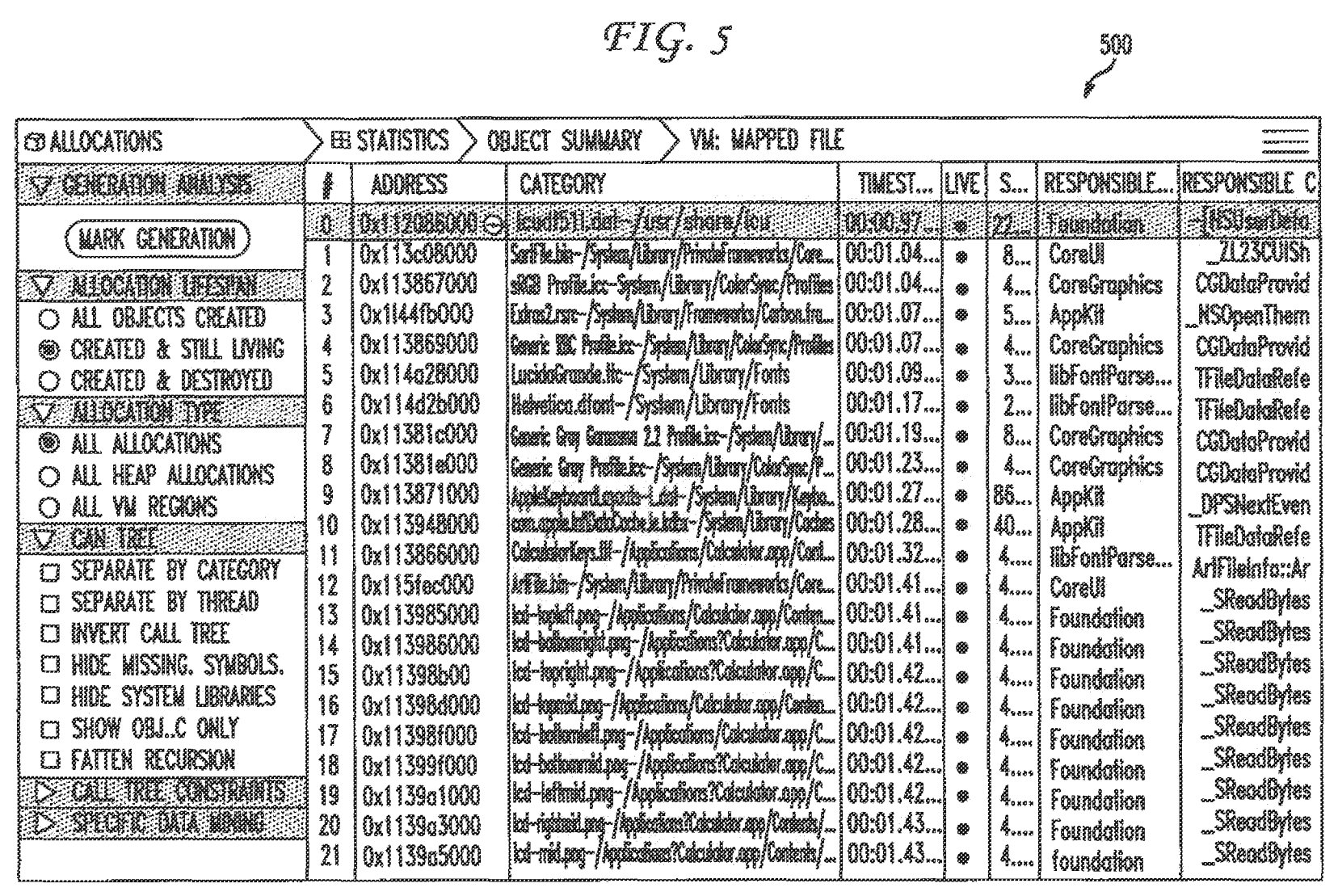

FIG. 4 illustrates an example interface view 400 of virtual memory allocations. The interface view 400 is based on the interface 300 from FIG. 3. The filter 304 in FIG. 3 can be used to limit the scope of information in the events view 302 by allocation type, to all virtual memory regions. The interface view 400 then displays the information associated with the virtual memory allocations. The interface view 400 can display the different statistics of the virtual memory allocations, as previously described in FIG. 3. The virtual memory allocations in the interface view 400 can be selected and expanded to view additional details relating to the selected virtual memory allocation(s). FIG. 5 illustrates an example expanded view 500 of a category of virtual memory allocations. Here, the expanded view 500 can display additional information about a selected category of virtual memory allocations in the interface view 400. The expanded view 500 can include specific details and/or statistics for the selected category of virtual memory allocations. For example, the expanded view 500 can list allocations, calls, objects, callers, references, regions of virtual memory, libraries, status information, timestamps, and any other information associated with the selected category of virtual memory allocations.

Figure 6:
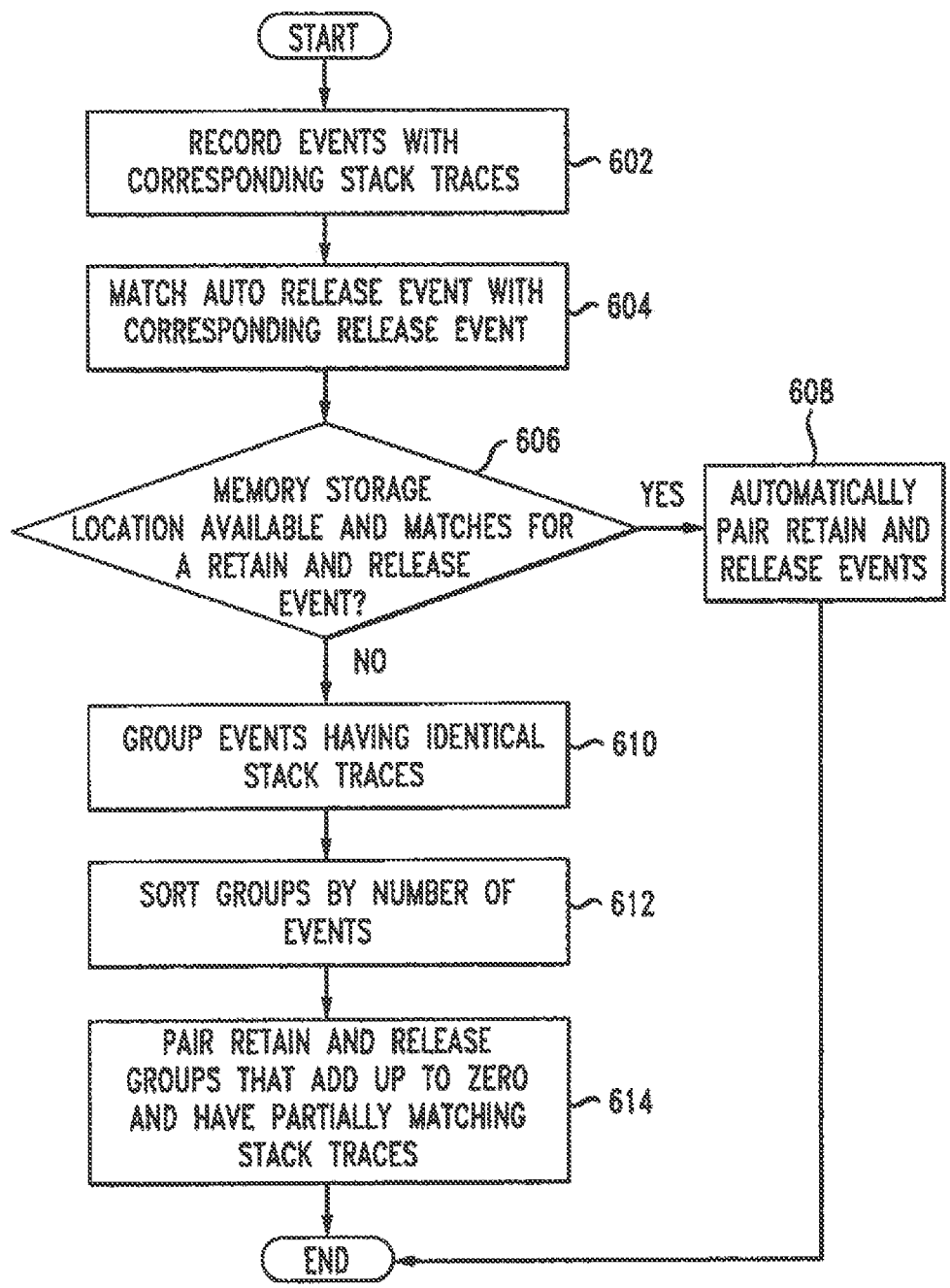
FIG. 6 illustrates an example flowchart for automatically pairing events.
Figure 7:
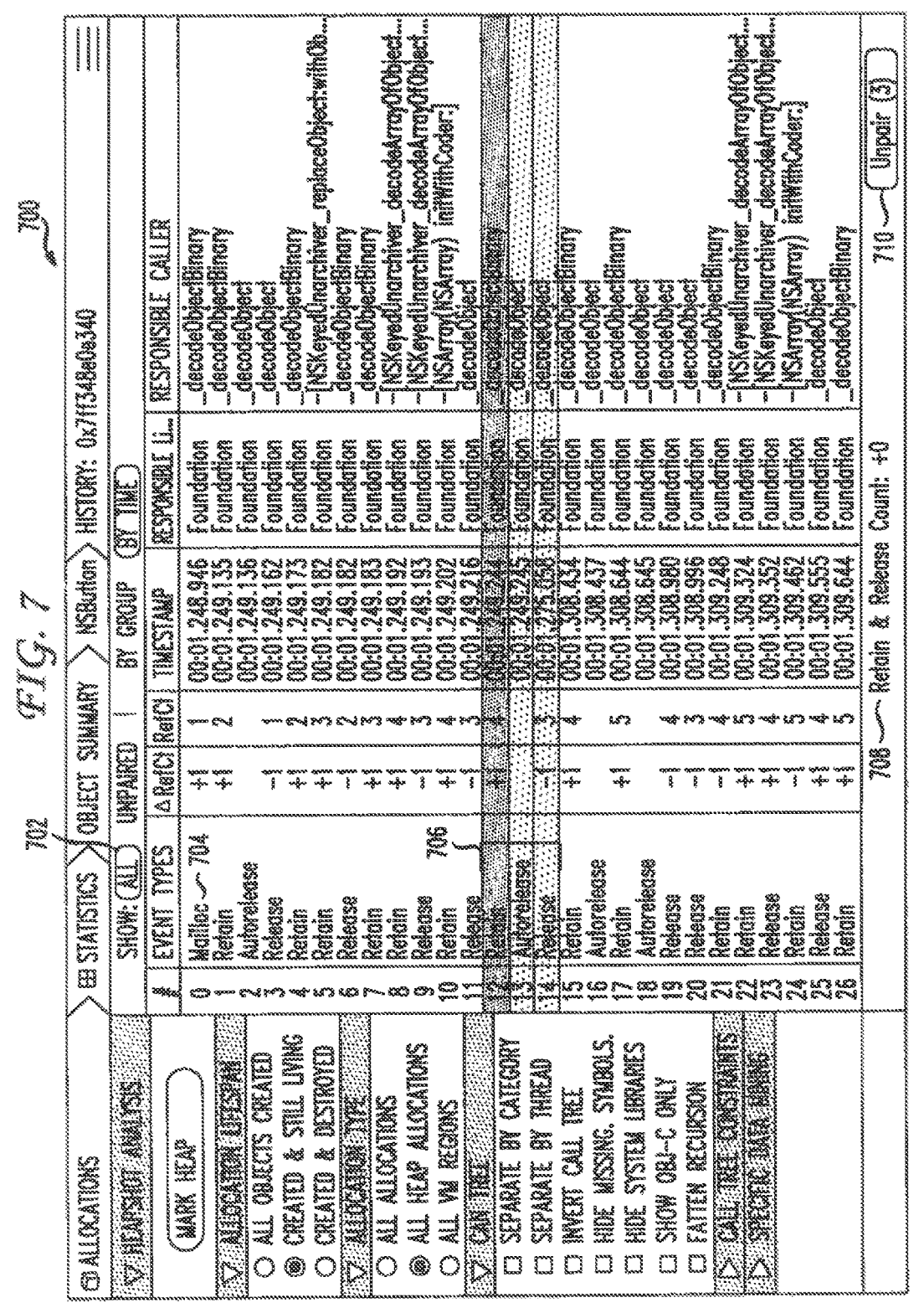
Figure 8:
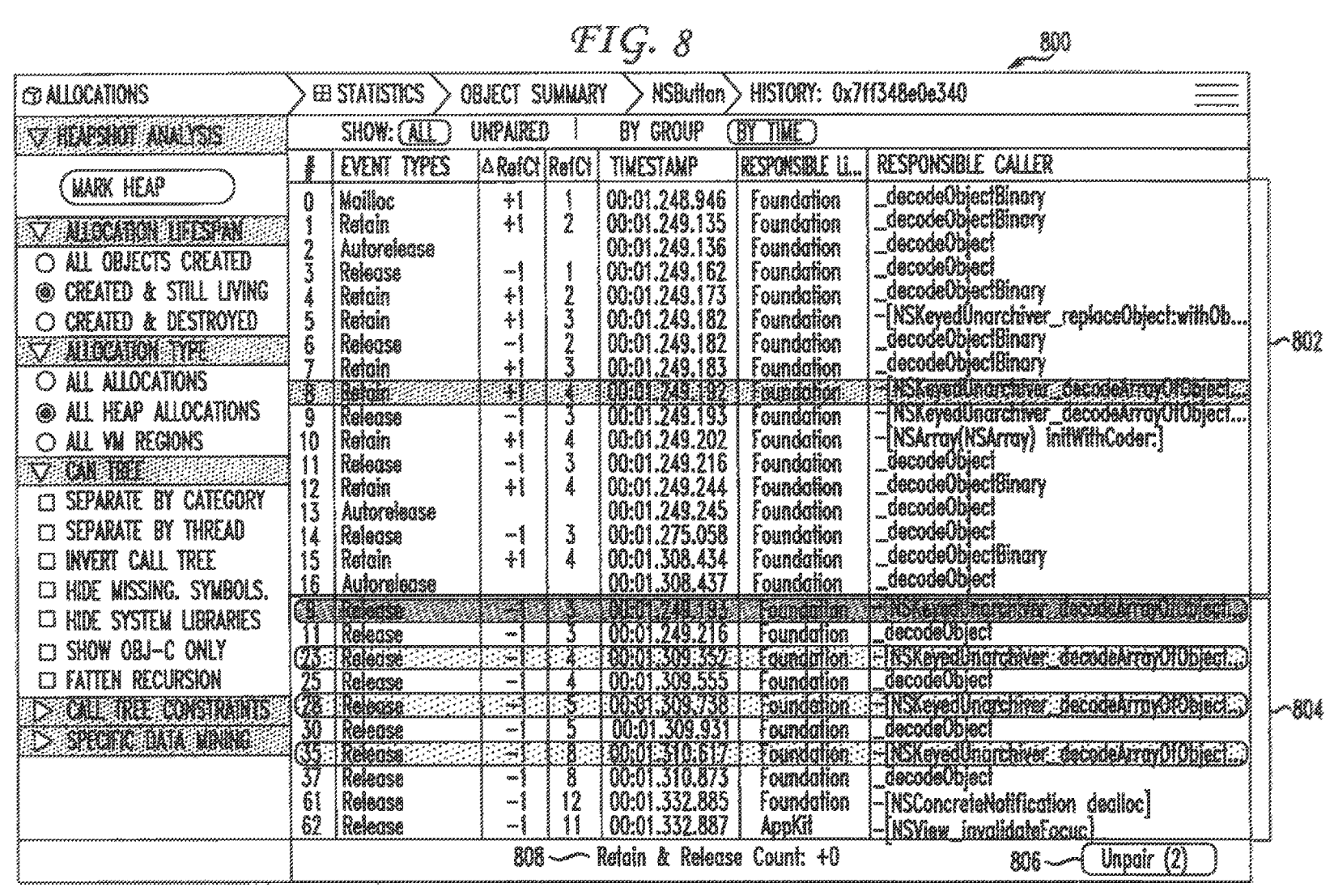

Having disclosed various systems and concepts for managing allocations and deallocations of virtual memory, the disclosure now turns to the exemplary embodiments for managing allocation and deallocation events illustrated in FIGS. 6-8.

FIG. 6 illustrates an example flowchart 600 for automatically pairing events. For the sake of clarity, the steps are described in terms of a system configured to practice the steps. The steps outlined herein are exemplary and can be implemented in any combination thereof, including combinations that exclude, add, or modify certain steps.

The system records events with corresponding stack traces (602). The system can analyze and record allocation and deallocation events and their corresponding stack traces. The allocation and deallocation events can be associated with one or more software processes. The system then groups autorelease events with corresponding release events (604). The system can analyze the stack traces of the recorded events to find recorded events with matching stack traces. The system can form different groups based on different stack traces. Each group can include two or more events having a particular stack trace.

The system can instrument functions in a compiled code associated with a software process and determine retain counts of objects being operated upon by the functions of respective events associated with the functions. The functions can operate on memory storage locations that, when available, can be recorded into the events.

Next, the system determines if any retain and release events have matching memory storage locations (606). The system then automatically pairs any retain and release events having matching memory storage locations (608). The automatically paired retain and release events can be deemed to be exact matches. Two events can be deemed to be an exact match if a retain event and a subsequent release event share a memory storage location, with no events having that memory storage location in between. Here, the two matching events can be paired with a high level of confidence as being exact matches.

The system also groups events having identical stack traces (610). Next, the system sorts groups by number of events in the groups (612). The system then pairs retain and release groups that add up to zero and have partially matching stack traces (614). Here, the system analyzes the retain and release events in the respective retain and release groups to determine if the combination of events add up to zero. At the same time, the system compares the stack traces of the events in the retain and release groups to determine if any of the items in the stack traces match. Groups of events can be paired when a collection of groups is identified where, together, they contain an identical number of retain and release events and the groups have at least partially matching stack traces. Moreover, the system can pair the retain and release groups in response to a request from a user or automatically based on a determination that the retain and release groups add up to zero and have partially matching stack traces.

The system can also pair events based on a threshold, such as a likelihood that the events are corresponding and/or matching allocation and deallocation events. When pairing events, the system can assign each pair a confidence level. In some cases, the confidence level can be based on an estimated likelihood that the events match. A match can refer to events that allocate, deallocate, and/or reference a same region of memory. For example, an event that allocates a specific region of virtual memory can match another event that deallocates that specific region of virtual memory allocated by the first event. In some embodiments, the confidence level of a pairing can be based on the size of the matching stack traces of the events in the pairing. For example, a pairing with events having a matching stack trace that is longer or deeper than the matching stack trace of events in another pairing can have a higher confidence level than the other pairing. Thus, the confidence level of a pairing can increase as the size of a matching stack trace increases.

The system can instrument functions in compiled code to determine retain counts of objects being operated on by the functions in the compiled code. For example, the system can instrument the compiled code's retain and storage functions to identify any exact pairing matches. The compiled code can refer to the runtime, code compiled by the compiler, a virtual machine layer, or any middle layer, for example. If there is a slot for a retain—that is, an object is known to have been retained to a specific memory location via a runtime call such as objc_storeStrong or the @property entry points—then the retain can be paired via a release with slot information.

In some embodiments, pairing can be done based on effective retain counts (ERC). Here, autorelease events can be considered to have an ERC of −1 for the purpose of pairing. This is because autorelease events are more akin to the codepath of the retain than the release of the later @autoreleasepool (AP) pop. This can mean that the corresponding releases coming from the AP pop need to be weakened to an ERC of 0, if possible. Since, in some cases, only events corresponding to the current address are considered, the only AP pops to match are the ones that involve the object directly. This can be approximated by keeping a "minimum" stack size past the AP pop frame that should indicate releases of the target object directly, as opposed to releases from being in a collection that is popped or deallocated.

Autorelease events can be associated with their corresponding AP pop release by keeping a stack of pending autorelease event identifiers. All releases with minimum-length AP pop stacks, as described above, can be added to an AP pop identifier stack if the pending stack is larger than the current matching AP pop stack.

The retains and releases can be paired in ERC groups. Each group can be created by looking for identical backtraces and adding up the ERCs of the events. Every event can be given a node in a pairing data table. If an event has an identical backtrace to a node that has already been identified, then the 'primary' node can acquire its ERC, and the new node can be weakened to an ERC of 0.

In some embodiments, as nodes are inserted into the table, all weakened nodes can be inserted backwards from the end, as they no longer exist in the table for the purpose of pairing by ERC, since it is more efficient to store them in the table and generate a linked list structure than to have all primary ERCs contain their own array.

In some cases, the primary (inserted at the beginning, ERC !=0) table nodes can then be sorted by the keys. For example, the primary table nodes can be sorted as follows: Primary: descending abs(ERC), Secondary: "ascending" backtrace. This can be a cold-to-hot frame-by-frame comparison that can have the effect of ordering the nodes in a call-tree-like fashion, for example.

With the nodes in ERC groups (e.g., +5, −5, +5, +5, +4, −4, etc.) and sorted by backtrace, the system can consider each group independently. The system can compare the backtraces of nodes to determine the commonality. With a commonality threshold (at the top level: 1), the system can find the minimum commonality between nodes and scan until that commonality is greater, and then recurse and look for pairs at the deeper level; and/or less, which indicates that a pair is possible, and loosen the commonality if the threshold allows, or alternatively fail to pair at that level. The system can try to find functions under which the retain/release counts are zero for a given abs(ERC) tree.

FIG. 7 illustrates an example interface 700 for managing pairings of events. The interface 700 can include a view 704 of recorded events. Each recorded event can be listed in the view 704 with corresponding details, such as event type, reference count, retain count, timestamp, responsible library, responsible caller, dependencies, file locations, framework, status, etc. The view 704 can identify paired events 706 from the recorded events. In some embodiments, the view 704 can identify the paired events 706 by highlighting the events in the pairing. The paired events 706 can be either manually or automatically paired events. The interface 700 can include filter options 702, to adjust the scope of recorded events displayed in the view 704. For example, the filter options 702 can include an option to view all recorded events, all unpaired events, all paired events, all pairing possibilities, etc. The contents of the view 704 can also be sorted based on any of the contents, such as the timestamp or the event type, for example.

The interface 700 can include a retain count 708. The retain count 708 can indicate the retain and release count of the paired events 706. In some aspects, the retain count 708 can indicate the retain count of other events, such as all of the recorded events, some of the recorded events, other paired events, unpaired events, selected events, a group of events, etc. The interface 700 can also include a pairing button 710 to manually pair and/or unpair events. With the pairing button 710, a user can select two or more events and pair the events by pressing the pairing button 710. The user can also select paired events and press the pairing button 710 to unpair the events. In some cases, the pairing button can indicate whether it is in pairing or unpairing mode. For example, if an active selection of events in the interface 700 includes unpaired events, the pairing button 710 can indicate that it is in pairing mode. Here, the user can press the pairing button to manually pair the unpaired events.

In some cases, the interface 700 can also display one or more suggested events for pairing. FIG. 8 illustrates an example interface 800 for managing suggested pairings of events. The interface 800 can display recorded events, as previously described in FIG. 7. Moreover, the interface 800 can include an upper view 802, which can display a list of recorded events, and information associated with the recorded events, as described in FIG. 7. The interface 800 can also include a lower view 804, which can include one or more possible or suggested events for pairing. The lower view 804 can include any information associated with the possible or suggested events, such as event type, reference count, reference values, reference count changes, timestamp, responsible library, responsible caller, file location, dependencies, framework, status, and/or any other information associated with the possible or suggested events.

The events listed in the lower view 804 can include events that have been identified as possible matches for one or more events in the upper view 802. For example, if a user selects an event listed in the upper view 802, the interface 800 can subsequently update the lower view 804 to display any possible matches for the selected event. The lower view 804 can display additional information and/or statistics for any of the possible matches listed to allow the user to analyze and manage the possible matches. If the user determines that one or more of the possible matches listed in the lower view 804 are indeed a match of the selected event from the upper view 802, he or she can manually pair the events using the pairing button 806. With the interface 800, the user can browse through the events in the upper view and/or the lower view 804, manipulate events by pairing or unpairing the events, sort the events, select events to view additional information about the selected events, etc.

The events listed in the lower view 804 can be shaded to indicate that they are possible matches. In some cases, the color and/or shade of one or more of the events listed in the lower view 804 can vary based on a confidence level of the possible match and/or a likelihood that the respective event is a match for the selected event from the upper view 802. Similarly, the events listed in the lower view 804 can be identified as possible matches based on a confidence level of the possible match and/or a likelihood that the events are a match for the selected event from the upper view 802. The events listed in the lower view 804 can thus be automatically displayed, or selected for display, in the lower view 804 as possible matches, based on a confidence level of the possible match and/or a likelihood that the events are a match for the selected event from the upper view 802. For example, an event can be selected as being a possible match if the possible match has a low confidence level. A low confidence level can be determined based on many factors, such as similarity of stack traces, size of stack traces, retain count, etc. Moreover, a low confidence level can indicate that some aspects or characteristics of the events suggest that the events are a match, while other aspects or characteristics of the events do not support a finding that the events are a match and/or otherwise suggest that the events are not a match. For example, events can have similar or identical stack traces, which can indicate that the events are a match, while having a retain count that is not zero, which can suggest that the events are not a match. Thus, if an event in the lower view 804 has a stack trace that matches that of an event in the upper view 802, but the events do not otherwise have a retain count of zero, then the event in the lower view 804 can be treated as being a possible match having a low confidence level. Because the event has a low confidence level of being a match, the event is not automatically paired with the event from the upper view 802, but it is instead displayed in the lower view 804 as a suggested match, which can be manually paired by the user via the pairing button 806.

The threshold for suggesting or indicating that two or more events are a possible match versus automatically pairing the events can be configured to any desired sensitivity level. Moreover, the lower view 804 can provide information, statistics, and/or details about the events listed as possible matches, to allow a user to determine if an event should be paired with an event from the upper view 802. The interface 800 can also indicate the retain count of events 808, to help the user determine if the events should be paired.

Figure 9B:
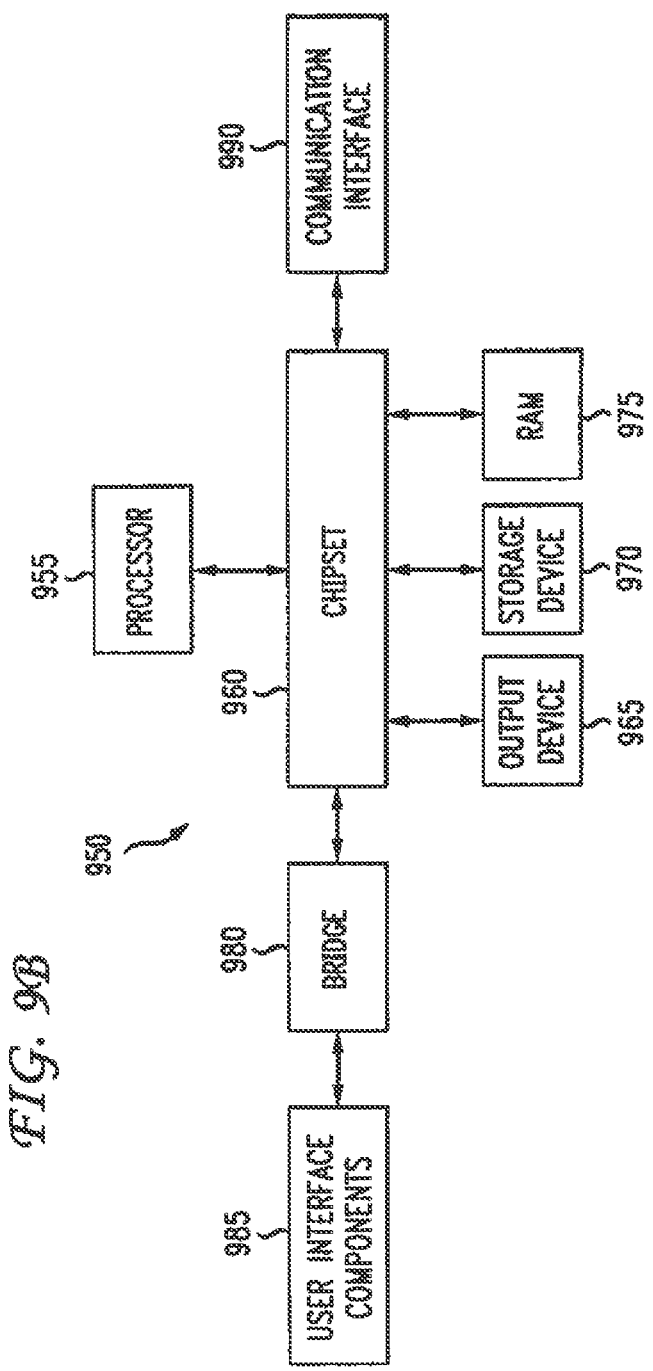

FIG. 9A and FIG. 9B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

We claim:

1. A method comprising:
  recording events with corresponding stack traces, wherein the events are associated with memory events of a process running on a device;
  grouping recorded events having matching stack traces to yield event groupings, wherein the event groupings comprise a first memory event grouping and a second memory event grouping;
  instrumenting functions in a compiled code associated with the process to determine memory retain counts of respective events associated with the functions in the compiled code; and
  automatically pairing events from the first memory event grouping with events from the second memory event grouping based on the memory retain counts of the respective events to yield paired events wherein automatically pairing events from the first memory event grouping with events from the second memory event grouping is further based on a threshold value, and wherein the paired events are assigned respective pairing confidence levels.

2. The method of claim 1, wherein automatically pairing events from the first memory event grouping with events from the second memory event grouping is further based on respective memory retain counts associated with the event groupings.

3. The method of claim 1, wherein a first pairing confidence level is assigned to events identified as exact matches by matching memory storage locations gathered with events acquired in reference counting functions in the compiled code.

4. The method of claim 3, wherein groups of events having matching stack traces are assigned a second pairing confidence level when the events in the groups together represent a net memory retain count change of zero, and wherein the second pairing confidence level is lower than the first pairing confidence level.

5. The method of claim 4, wherein the second pairing confidence level increases as a size associated with each of the matching stack traces increases, and wherein the second pairing confidence level decreases as the size associated with each of the matching stack traces decreases.

6. The method of claim 5, wherein a second paired group in the paired events is assigned a third confidence level when all events in the second paired group have matching stack traces and an associated memory retain count of the second paired group is not zero, and wherein the third pairing confidence level is lower than the second pairing confidence level.

7. A system comprising:
a processing system;
a graphical user interface; and
a non-transitory computer-readable storage medium having stored therein instructions which, when executed by the processing system, cause the processing system to perform operations comprising:
recording events with corresponding stack traces to yield recorded events, wherein the events are associated with memory events of a process at a device;
displaying, via the graphical user interface, the recorded events;
identifying matching event groupings from the recorded events based on at least one of memory retain counts associated with the recorded events and a stack trace similarity of the recorded events; and
displaying, via the graphical user interface, the matching event groupings as paired events.

8. The system of claim 7, wherein the graphical user interface includes a pairing button to allow a user to perform at least one of manually pair events displayed in the graphical user interface and manually unpair events displayed in the graphical user interface.

9. The system of claim 7, the non-transitory computer-readable storage medium storing additional instructions which, when executed by the processing system, result in operations further comprising:
receiving a request to manually pair events displayed in the graphical user interface;
in response to the request, pairing the events to yield paired events; and
displaying the paired events via the graphical user interface.

10. The system of claim 7, the non-transitory computer-readable storage medium storing additional instructions which, when executed by the processing system, result in operations further comprising:
receiving a request to manually unpair events displayed in the graphical user interface;
in response to the request, unpairing the events to yield upaired events; and
displaying the upaired events via the graphical user interface.

11. The system of claim 7, the non-transitory computer-readable storage medium storing additional instructions which, when executed by the processing system, result in operations further comprising:
identifying possible matches of events, the possible matches of events comprising events having a likelihood of being a match of a recorded event displayed in the graphical user interface, wherein the possible matches of events are identified based on a confidence level, and wherein the confidence level is based on a predetermined threshold; and
displaying the possible matches of events via the graphical user interface.

12. The system of claim 7, the non-transitory computer-readable storage medium storing additional instructions which, when executed by the processing system, result in operations further comprising displaying, via the graphical user interface, a stack trace associated with a recorded event from the recorded events.

13. A non-transitory computer readable medium storing instructions which, when executed by a data processing system, causes the data processing system to perform a method comprising:
recording events with corresponding stack traces, wherein the events are associated with memory events of a process running on a device;
grouping recorded events having matching stack traces to yield event groupings, wherein the event groupings comprise a first memory event grouping and a second memory event grouping;
instrumenting functions in a compiled code associated with the process to determine memory retain counts of respective events associated with the functions in the compiled code; and
automatically pairing events from the first memory event grouping with events from the second memory event grouping based on the memory retain counts of the respective events to yield paired events wherein automatically pairing events from the first memory event grouping with events from the second memory event grouping is further based on a threshold value, and wherein the paired events are assigned respective pairing confidence levels.

14. The medium of claim 13, wherein automatically pairing events from the first memory event grouping with events from the second memory event grouping is further based on respective memory retain counts associated with the event groupings.

15. The medium of claim 13, wherein a first pairing confidence level is assigned to events identified as exact matches by matching memory storage locations gathered with events acquired in reference counting functions in the compiled code.

16. The medium of claim 15, wherein groups of events having matching stack traces are assigned a second pairing confidence level when the events in the groups together represent a net memory retain count change of zero, and wherein the second pairing confidence level is lower than the first pairing confidence level.

17. The medium of claim 16, wherein the second pairing confidence level increases as a size associated with each of the matching stack traces increases, and wherein the second pairing confidence level decreases as the size associated with each of the matching stack traces decreases.

18. The medium of claim 17, wherein a second paired group in the paired events is assigned a third confidence level when all events in the second paired group have matching stack traces and an associated memory retain count of the second paired group is not zero, and wherein the third pairing confidence level is lower than the second pairing confidence level.

* * * * *